United States Patent [19]
Nauth et al.

[11] Patent Number: 6,136,351
[45] Date of Patent: Oct. 24, 2000

[54] STABILIZATION OF FERMENTED DAIRY COMPOSITIONS USING WHEY FROM NISIN-PRODUCING CULTURES

[75] Inventors: K. Rajinder Nauth, Wheeling; Scott Brooks, Des Plaines, both of Ill.

[73] Assignee: Kraft Foods, Inc., Northfield, Ill.

[21] Appl. No.: 09/386,609

[22] Filed: Aug. 31, 1999

Related U.S. Application Data

[60] Provisional application No. 60/098,518, Aug. 31, 1998.

[51] Int. Cl.[7] .......................................................... A23C 9/12
[52] U.S. Cl. .................................. 426/41; 426/34; 426/36; 426/582; 426/583
[58] Field of Search ................................... 426/34, 36, 41, 426/580, 582, 583, 38, 39, 40, 42, 43

[56] References Cited

U.S. PATENT DOCUMENTS

| | | | |
|---|---|---|---|
| 4,584,199 | 4/1986 | Taylor | 426/36 |
| 4,597,972 | 7/1986 | Taylor | 426/36 |
| 4,740,593 | 4/1988 | Gonzalez et al. | 435/243 |
| 4,798,729 | 1/1989 | Anders et al. | 426/326 |
| 4,888,191 | 12/1989 | Anders et al. | 426/281 |
| 5,015,487 | 5/1991 | Collison et al. | 426/332 |
| 5,017,391 | 5/1991 | Anders et al. | 426/129 |
| 5,186,962 | 2/1993 | Hutkins et al. | 426/61 |
| 5,338,682 | 8/1994 | Sasaki et al. | 435/253.4 |
| 5,451,369 | 9/1995 | Daeschel et al. | 422/28 |
| 5,458,876 | 10/1995 | Monticello | 424/94.61 |
| 5,527,505 | 6/1996 | Yamauchi et al. | 426/42 |

OTHER PUBLICATIONS

Chung et al., "Effects of Nisin on Growth of Bacteria Attached to Meat", *Applied and Environmental Microbiology*, Jun. 1989, vol. 55, No. 6. pp. 1329–1333.

Maas et al. "Sodium Lactage Delays Toxin Production by *Clostridium botulinum* in Cook–in–Bag Turkey Products", *Applied and Environmental Microbiology*, Sep. 1989, vol. 55, No. 9, pp. 2226–2229.

Kosikowski, Frank, "Bakers', Neufchatel, and Cream Cheese", *Cheese and Fermented Milk Foods*, 2d 1977, pp. 144–167.

*Primary Examiner*—Leslie Wong
*Attorney, Agent, or Firm*—Fitch, Even, Tabin & Flannery

[57] ABSTRACT

This invention provides stabilized fermented dairy compositions such as yogurt in which the development of excessive acidity and bitter tastes during storage is essentially eliminated. The stabilized compositions are attained by the incorporation of nisin-containing whey derived from a nisin-producing culture. The invention also relates to a method of preparing a fermented dairy product stabilized against the development of excessive acidity, to a method for stabilizing fermented dairy products, and to a method for stabilizing a fermented dairy product against depletion of lactose during storage. The methods include adding nisin-containing whey derived from a nisin-producing culture to the fermented dairy product. The whey is obtained from a nisin-producing culture by removing the nisin-producing microorganisms with the curds from the fermentation. The invention further provides methods which yield stabilized fermented dairy products that may be flavored and/or sweetened with syrups.

29 Claims, 1 Drawing Sheet

STABILIZATION OF FERMENTED DAIRY COMPOSITIONS USING WHEY FROM NISIN-PRODUCING CULTURES

This application is based upon provisional application U.S. Ser. No. 60/098,518, filed Aug. 31, 1998.

FIELD OF THE INVENTION

This invention relates to fermented dairy compositions, especially yogurt-type compositions, which are stabilized against the development of excessive acidity and off-flavors or off-tastes during storage. The stabilized compositions are attained by the incorporation of nisin-containing whey derived from a nisin-producing culture. The invention also relates to a method of preparing a fermented dairy product stabilized against the development of excessive acidity which method comprises adding nisin-containing whey derived from a nisin-producing culture to the fermented dairy product. This invention also relates to a nisin-containing whey compositions which can be used to stabilize food products.

BACKGROUND OF THE INVENTION

Fermented dairy products are normally prepared by culturing compositions with appropriate microorganisms to yield products such as yogurts, buttermilks, and sour creams. For example, yogurt is generally made by fermenting milk with a culture that contains thermophilic organisms such as *Streptococcus salivarius* subsp. thermophilus (ST) and *Lactobacillus delbrueckii* subsp. bulgaricus (LB). Additional cultures such as *Lactobacillus acidophilus* and bifidobacteria may also be included. Thermophilic cultures have an optimum growth temperature around 40° C. It is known that acid production in yogurt is first initiated by ST followed by LB (Pette et al., 1950, Neth. Milk Dairy Journal 4:197–208). It is an intrinsic attribute of ST and LB that they do not grow at 15° C. or lower (Rasic et al., Yogurt, 1978, Page 227). Nevertheless the production of acidic fermentation products in these organisms can continue during storage without accompanying growth. The carbon source for such acidic fermentation products includes saccharides present in the dairy products used in the fermentation, such as lactose, for example. The production of acidic products by ST generally stops at pH values of about 3.9–4.3 and that by LB at pH values of about 3.5–3.8 (Rasic et al.). This continued production of acidic products in the absence of growth of the culture is termed uncoupled acid production. Due to the strong tendency for uncoupled acid production, yogurt found in the marketplace often suffers from the accumulation of excess acidic products which occurs during the storage involved in distribution and sale. Excess acidic products are often accompanied by development of bitterness.

Nisin is a peptide-like antibacterial substance produced by *Lactococcus lactis* subsp. lactis (formerly known as *Streptococcus lactis*). Its structure is illustrated in U.S. Pat. No. 5,527,505 to Yamauchi et al. The highest activity preparations contain about 40 million IU per gram. A commercial preparation, NISAPLIN®, containing about 1 million IU per gram is available from Aplin & Barrett Ltd., Beaminster, Dorset, England. Nisin has no known toxic effects in humans, and is widely used in a variety of prepared dairy foods.

A number of efforts have been reported since 1975 directed to reducing uncoupled acid production by controlling the post-fermentation acidification of yogurt. In some of these studies, a nisin producing culture was introduced in an attempt to inhibit these effects. Kalra et al. (Indian Journal of Dairy Science 28: 71–72 (1975)) incorporated the nisin producing culture *Streptococcus lactis* (now known as *L. lactis* subsp. lactis) along with the yogurt culture before fermentation. Others introduced nisin in milk prior to fermentation (Bayoumi, Chem. mikrobiol. technol. lebensm. 13:65–69 (1991)) or following fermentation (Gupta et al., Cultured Dairy Products Journal 23: 17–18 (1988); Gupta et al., Cultured Dairy Products Journal 23: 9–10 (1989)). In all cases, the rate of post-fermentation acidification was only partially inhibited by these treatments and the yogurt continued to become more acidic throughout its shelf life. To the extent that saccharides such as lactose contribute to the production of excess acidic products, attempts have been made to minimize this phenomenon by removing the saccharides prior to fermentation, by procedures such as ultrafiltration and diafiltration, for example.

In U.S. Pat. No. 5,527,505, by Yamauchi et al., yogurt from raw milk was produced by incorporating a nisin producing strain, *Lactococcus lactis* subsp. lactis, along with the traditional yogurt culture consisting of ST and LB. Yamauchi et al. teach that the lactococci are needed to secrete the nisin, whose effect is to retard the activity of ST and LB. The resulting yogurt therefore contains the lactococci used to produce the nisin. Nonetheless, the acidity of yogurt containing the nisin-producing bacteria increased by 64% to 96% in 14 days, in various experiments inoculated with differing amounts of *L. lactis* subsp. lactis, compared to the initial acidity at the completion of fermentation. Other studies (Hogarty et al., J. Fd. Prot. 45:1208–1211 (1982); Sadovski et al., XX International Dairy Congress, Vol. E: 542-5-44 (1978)) also noted acid production and development of bitterness at low temperature by some mesophilic starter lactococci in dairy products.

Chung et al. (Appl. Envir. Microbiol. 55, 1329–1333 (1989)) report that nisin has an inhibitory effect on gram-positive bacteria, such as *L. monocytogenes, Staphylococcus aureus* and *Streptococcus lactis*, but has no such effect on gram-negative bacteria such as *Serratia marcescens, Salmonella typhimurium* and *Pseudomonas aeruginosa* when these microorganisms are attached to meat.

In U.S. Pat. No. 5,015,487 to Collison et al., the use of nisin, as a representative of the class of lanthionine bacteriocins, to control undesirable microorganisms in heat processed meats is disclosed. In tests involving dipping frankfurters in nisin solutions, the growth of *L. monocytogenes* was effectively inhibited upon storage at 4° C.

Nisin has been added to cheeses to inhibit toxin production by *Clostridium botulinum* (U.S. Pat. No. 4,584,199 to Taylor). U.S. Pat. No. 4,597,972 to Taylor discloses a detailed example in which chicken frankfurter components are shown to require the presence of both added nitrite and added nisin in order to prevent or delay botulinum toxin production when challenged with *C. botulinum*.

Maas et al. (Appl. Envir. Microbiol. 55, 2226–2229 (1989)) report that lactate, when incorporated into a turkey meat vacuum-packed composition, delays the generation of botulinum toxin in a manner directly dependent on the concentration of lactate introduced into the composition. Maas et al. do not mention nisin.

In U.S. Pat. Nos. 4,888,191 and 5,017,391, Anders et al. disclose compositions and methods related to the use of lactate salts to delay *C. botulinum* growth in a foodstuff such as fish or poultry. The foods are heated to a temperature sufficient to cook the meat but not to sterilize the product.

Anders et al. suggest that lactate may be used alone, or in combination with other agents such as sodium nitrite. These patents fail to discuss nisin or its properties.

For chocolate-flavored yogurt, an increase in yogurt acidity during storage is especially troublesome because cocoa flavor tends to become more bitter with increasing acidity (The Wall Street Journal A13A, Jun. 20, 1995). There is also a loss of the desired dark, rich color of the chocolate with increasing acidity. Generally, for chocolate yogurt the pH of yogurt fermentation should not fall below about 5.5 throughout its refrigerated shelf life (generally about eight weeks) in order that the product retains a hint of yogurt flavor with an indulgent flavor of chocolate.

There currently does not appear to be any method that can minimize or eliminate the acidity increase in yogurt during storage, nor a method to minimize or prevent the fermentation of saccharides such as lactose and/or galactose that may be present. Attempts to arrest the production of acid by yogurt cultures, by the addition of nisin before or after yogurt fermentation or the addition of a nisin producing culture to a yogurt culture before or after milk fermentation, have not been successful. The need to arrest uncoupled acid production, and to minimize the fermentation of saccharides thus remains. This unsatisfied need extends as well to the lack of a method to inhibit the concomitant production of bitterness accompanying the uncoupled acid production. Finally for flavored fermented dairy products, this need is of special significance since excess acidity diminishes the flavor and stability of added flavorings such as chocolate.

SUMMARY OF THE INVENTION

The methods and compositions of the invention are concerned with providing procedures and products which overcome the difficulties related to uncoupled acid production in fermented dairy products. According to the present invention, nisin-containing whey obtained from a nisin-producing culture is added to the fermented dairy product. In an important embodiment, the whey is prepared from a fermented dairy culture of nisin-producing microorganisms by separating the resulting whey from the curds. In an alternative embodiment, the nisin-containing whey is obtained from the fermentation of a fortified cheese whey composition using nisin-producing microorganisms. The nisin-containing whey, when added to the fermented dairy product, inhibits the further growth of the microorganisms producing the fermented dairy product. The present invention discloses that nisin-containing whey is especially useful in yogurt products.

This invention provides methods of producing fermented dairy products that are stable to uncoupled acid production upon storage. This invention also provides a nisnin-containing composition which is useful in stabilizing food products. The invention also provides the stable fermented products in which excess acid products, excess acidity, and attendant bitterness are minimized or eliminated.

The invention further provides methods which yield flavored and stabilized fermented dairy products with improved flavor and color. The invention encompasses as well the stabilized flavored products, especially those containing cocoa, chocolate, or chocolate flavoring.

A further embodiment of the invention relates to methods of producing a stabilized fermented dairy product additionally containing a syrup for sweetening, and the sweetened product.

The invention also provides a method of stabilizing fermented dairy products, including those containing added syrups or flavorings.

The invention additionally provides methods of stabilizing a fermented dairy product against depletion of lactose during storage.

The invention further provides a nisin-containing whey composition which is suitable for stabilizing food compositions. The nisin-containing whey is obtained by fermenting a dairy composition with a culture of nisin-producing microorganisms.

Other objects and advantages of the present invention will be apparent to those skilled in the art upon consideration of the present specification.

DETAILED DESCRIPTION OF THE INVENTION

Figure 1:
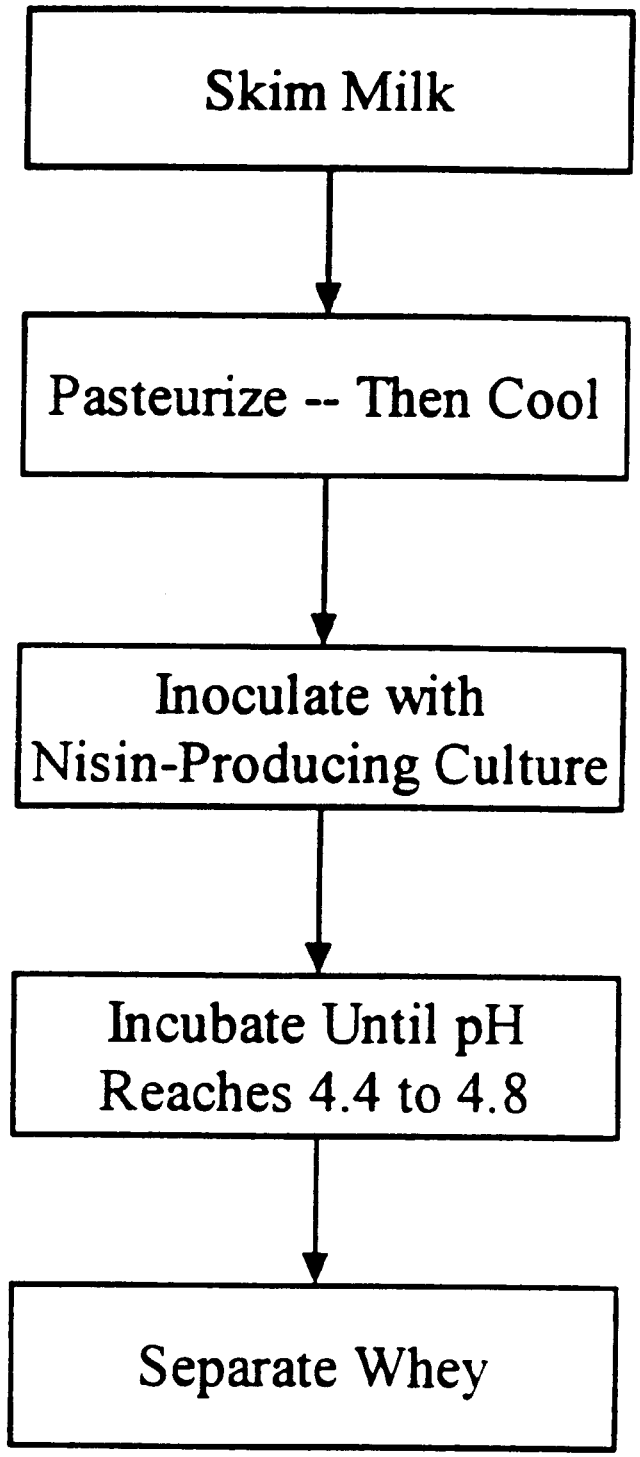
FIG. 1 provides a flow diagram for preparing a nisin-containing whey derived from a nisin-producing culture.

According to the present invention, production of excess acidity, and of excessive concentrations of acidic fermentation products, is effectively inhibited in fermented dairy products, especially yogurt-containing products, by incorporating nisin-containing whey. Likewise, depletion of lactose is effectively inhibited by the addition of the nisin-containing whey.

The preservative and stabilizing effects of nisin-containing whey find application in the preparation of other food products in addition to spreads of the instant invention. These include cooked meat products, mayonnaise products, and cream cheese products. Disclosures of these inventions, which are related to the instant application, appear in the applications entitled "Stabilization of Cooked Meat Compositions Using Whey from Nisin-Producing Cultures", U.S. Ser. No. 60/098,468, filed Aug. 31, 1998, "Stabilization of Mayonnaise Spreads Using Whey from Nisin-Producing Cultures", U.S. Ser. No. 60/098,516, filed Aug. 31, 1998, and "Stabilization of Cream Cheese Compositions Using Nisin-Producing Cultures", U.S. Ser. No. 60/098,472, filed Aug. 31, 1998, respectively, and are incorporated hereby in their entireties by reference.

For purposes of this invention, the term "nisin-containing whey" is intended to include the whey product, separated from the curd, derived from a nisin-producing culture. Generally, such a nisin-containing whey is obtained by any of a variety of equivalent procedures involving the fermentation of a nisin-producing microorganism. In one such procedure, a pasteurized dairy product such as milk or whey is first inoculated with the nisin-producing microorganism. After the dairy product curdles, the nisin-containing whey is separated from the curds of the curdled culture. The curds and whey can be separated by any conventional technique, including, for example, centrifugation, filtration, and the like. This method effectively removes most or essentially all of the microorganisms in the nisin-containing whey. In an alternative procedure, the nisin-containing whey is obtained from the fermentation of a fortified cheese whey composition using nisin-producing microorganisms. In this procedure, after the pH in the fermentation has fallen to about 5.5, the pH is then maintained at this vaue for 8–10 hrs before allowing the pH to drop further. The nisin-containing whey, separated from the corresponding curds, is then employed in the products and methods of this invention.

Fermented dairy products encompassed by this invention include yogurt, buttermilk, dairy toppings, sour cream, kefir, and similar fermented compositions. The preferred fermented dairy product of this invention is yogurt. Generally, yogurt is prepared by fermenting milk with a culture of thermophilic organisms such as *Streptococcus salivarius* subsp. thermophilus (ST) and *Lactobacillus delbrueckii* subsp. bulgaricus (LB) that produce lactic acid and other acidic fermentation products. Additional cultures such as *Lactobacillus acidophilus* and bifidobacteria may also be included. Acid production in yogurt is initiated by ST, and is followed by that due to LB. The acid product may continue even after the actual growth of the culture, in terms of its cell count, has stopped. In particular, fermentation of saccharides and production of acidic products may continue during storage at low temperature, and is often accompanied by accumulation of a bitter taste.

According to the methods of this invention, fermented dairy cultures are blended with nisin-containing whey obtained from dairy cultures of microorganisms that produce nisin, an antibacterial substance that inhibits the growth of the LB and ST. Nisin is elaborated by certain acid producing cultures, such as *Lactococcus lactis* subsp. lactis (formerly known as *Streptococcus lactis*). The present inventors have unexpectedly found that when nisin-containing whey derived from a nisin-producing culture is introduced into a fermented dairy culture this uncoupled formation of acidic products is inhibited. Although other workers in the dairy arts have incorporated nisin alone or complete nisin-producing cultures into fermented dairy products in attempts to inhibit uncoupled acid production, their efforts in general have been unsuccessful. The addition of either nisin alone or complete nisin-producing cultures (containing both curds and whey) are not effective in inhibiting uncoupled acid production.

It is shown herein that nisin-containing whey has effects on nonpathogenic microorganisms beyond those obtained by addition of a purified preparation of nisin. Furthermore, it is shown in Example 3 that nisin-containing whey contains, or preserves, a significant concentration of lactate characteristic of whey. Thus nisin-containing whey may in general be understood to contain both nisin and lactate.

The fermenting cultures capable of producing nisin-containing whey have the potential of secreting many fermentation products into the medium, namely, into the whey of the culture. Thus, in addition to nisin and lactate, there may be further components present in nisin-containing whey produced by the fermentations yielding this whey. Among such components may be certain substances which contribute to the beneficial properties of the preservable preparations of the invention, and to the beneficial effects of the methods of the invention. Without wishing to limit the scope of this invention, therefore, the term "nisin-containing whey" encompasses all components contained therein, both those currently known and those which may remain uncharacterized at the present time, that contribute to the beneficial attributes of the present invention.

As used herein, "nisin-containing whey" also relates to the whey described above that has subsequently been reduced in volume to a more concentrated liquid, or that has been completely dried, by evaporation, lyophilization or comparable procedure. The term relates additionally to such a concentrated or dried whey that is subsequently reconstituted, either partially or completely, by the addition of water or a water-containing composition.

Surprisingly, the inventors have discovered that nisin-containing whey derived from nisin-producing cultures provides the sought-after effect, namely, that of inhibiting or preventing uncoupled production of acid in yogurt and yogurt-like products. Specifically, while not wishing to be limited by theory, it is believed that nisin-producing lactococci may contribute to or be responsible for the uncoupled acid production. Such lactococci in fermented dairy compositions were found to be able to grow and produce acid after about 23–27 days and sometimes up to at least 42 days. The cell count of the lactococci increased almost 100-fold, and the acidity and total acids increased concomitantly. These results were also found when yogurt was prepared with lactococci added to the culture, even though the presence of the lactococci appeared to inhibit the growth of the yogurt culture bacteria (i.e., LB and ST).

The inventors have found unexpectedly, however, that when only the whey derived from a dairy culture of the nisin-producing lactococcus microorganisms, separated from the corresponding curds, was added to a yogurt culture, acid production was inhibited and LB and ST ceased to grow. When yogurt was blended with the whey which was separated from a culture of nisin-producing microorganisms in skim milk, the acidity of the yogurt blend was surprisingly found to remain unchanged throughout its desired eight weeks shelf life. Furthermore the populations of the yogurt-producing microorganisms did not change significantly during this interval. On the other hand, the cell count of the nisin-producing microorganism in the whey was significantly reduced from that which is found in the complete nisin-producing dairy culture itself. That is, as a consequence of separating the whey from the curdled culture, most of the microorganisms appear to remain with the curd, with only a small fraction retained with the whey. In general, the reduction in cell count of the nisin-producing microorganisms in the whey may be ten-fold, fifty-fold, one hundred-fold, or perhaps even higher. Without wishing to be limited by theory, these results suggest that whey derived from a nisin-producing culture has the effect of inhibiting the further growth of yogurt-producing microorganisms, such as LB and ST, and of minimizing and/or preventing the uncoupled production of acid.

In order to achieve these results, an effective amount of the nisin-containing whey derived from a nisin-producing culture is blended with the fermented dairy culture. Generally, such effective amounts may range from about 1% to about 10% of the final product, or more preferably from about 3% to about 5%. The nisin-containing whey separated from a nisin-producing culture may be added either during yogurt fermentation, prior to the desired endpoint, or at the desired endpoint. Preferably it is added to the fermented dairy culture at the desired endpoint of fermentation. At this point the fermentation culture has already set and the beneficial effects of adding the nisin-containing whey derived from a nisin-producing culture will achieve their optimum results. An additional advantage of the use of the nisin-containing whey of the present invention is its effect of preventing the continued fermentation of saccharides, such as lactose and/or galactose, that may be present in the starting materials (see Example 7). This eliminates the need to undertake an additional step, namely diafiltration to remove the saccharides, during the manufacture of these fermented dairy products.

Inhibition of uncoupled acid production in the resulting blend has the additional benefit of preserving the flavor and color of added flavorings, such as cocoa, chocolate, and chocolate flavorings. The flavorings of the invention are added to the blend simultaneously with or after the addition of the nisin-containing whey derived from a nisin-producing culture. Inhibition of uncoupled acid production in other fermented dairy products which have been processed to incorporate additional components may also be accomplished by treatment with the nisin-containing whey separated from a nisin-producing culture. Such products include those having syrups added for sweetness or flavor.

EXAMPLES

General Procedures

Bacteriological Enumeration. *Streptococcus salivarius* subsp. thermophilus was enumerated on M17 agar (Atlas, R. M., 1993, Handbook of Microbiological Media, CRC Press, Inc. Pages 148, 532, 621). *Lactobacillus bulgaricus* was enumerated on MRS agar (Atlas). The plates for ST and LB were incubated anaerobically at 40° C. for two days. The nisin producing lactococci were enumerated on BHI agar, incubated anaerobically at 30° C. for two days.

Assay of Nisin Activity. Nisin activity in the fermented milk was determined by the method of Fowler et al. (Techn. series. Soc. Bacteriol. 8:91–105 (1975)). A sensitive strain of *L. lactis* subsp. cremoris was used as an indicator. NISAPLIN®, a standardized preparation of nisin ($10^6$ units/g) from Aplin and Barrett Ltd., Beaminster, Dorset, England, was used as the nisin activity standard. Each assay plate included appropriate nisin standards.

Yogurt Production. A yogurt mix or white mass was preheated to the range of about 60–66° C. in an APV plate heat exchanger followed by homogenization at 1000 psi. The composition of a typical yogurt white mass is given in Table 1. It was then pasteurized by heating to about 100° C. for 38–40 seconds and then cooled to 43° C. The tempered white mass at 43° C. was inoculated with a commercial frozen culture ABY2C at 0.003% and allowed to ferment until the pH attained the desired pH value (generally about 5.5–5.6). The time taken to achieve the desired pH was about three hours. The fermented white mass was cooled to about 7° C. in the APV plate heat exchanger.

TABLE 1

Composition of Yogurt Mix

| Component | Lbs/Batch |
| --- | --- |
| Skim Milk | 57.8 |
| Cream | 1.6 |
| Non-fat Dry Milk | 0.7 |
| Gelatin | 0.4 |
| Starch | 2.3 |
| Sugar | 3.7 |
| Total | 66.5 |

Example 1

This example illustrates the production of nisin-containing whey from a nisin-producing culture. FIG. 1 presents a schematic flow chart illustrating the important steps in this process. A nisin-producing culture was inoculated at $5 \times 10^6$ cfu/ml in pasteurized skim milk cooled to 30° C. The mixture was allowed to incubate for about 16 hours and was then cooled to 5–7° C. The fermented milk had about $8.0 \times 10^8$ cfu/ml of the cultured bacteria, a pH of about 4.4 to 4.6, and a titratable acidity of 0.75%. It contained nisin equivalent activity of about 1300 international units/ml as determined by well assay using a nisin-sensitive strain of *Lactococcus lactis* subsp. cremoris. The cultured milk was centrifuged to separate the whey from the curd and the nisin-containing whey removed. A detailed comparison between the fermented milk and the resulting whey is given in Table 2. The whey contained more than about 100-fold fewer cfu/ml of the nisin-producing microorganisms compared to the fermented milk culture while still preserving the full nisin activity of the fermented milk. The curd retained more than 99% of the lactococcus counts determined for whey and curd.

TABLE 2

Characteristics of Centrifuged Nisin-Containing Whey Obtained from Lactococcus-Fermented Skim Milk

| | Fermented Milk | Whey | Curd |
| --- | --- | --- | --- |
| pH | 4.43 | 4.45 | 4.5 |
| Titratable acidity | 0.75% | 0.54% | |
| Culture count | $8.0 \times 10^8$ cfu/ml | $6.6 \times 10^6$ cfu/ml | $3.9 \times 10^9$ cfu/g |
| Nisin equivalent activity | 1300 IU/ml | 1300 IU/ml | 600 IU/g |

Comparative Example 1

This comparative examples illustrates uncoupled acid production in conventional yogurt. Fully fermented yogurt continues to become more acidic upon storage although the culture numbers remain essentially constant. When the yogurt fermentation was arrested at pH 6.3 by quick cooling to about 5° C., the cultures continued to produce acid for at least 2 weeks. During this period the pH dropped from 6.3 to 4.2. In a similar experiment, when the yogurt fermentation was arrested at pH 5.64 by quick cooling to about 5° C., the cultures continued to produce acid without concomitant growth through eight weeks (Table 3). During this period the pH dropped from 5.64 to 4.85 with a corresponding increase in titratable acidity from 0.40% to 0.56%. The final pH values of both samples (i.e., 4.2 and 4.85) were unacceptably low. The component flora present in the yogurt stayed essentially unchanged (Table 3).

TABLE 3

Profile of Yogurt Fermentation Terminated at pH 5.64 by Cooling to About 5° C.

| Time (weeks) | pH | Titr. Acid, % | ST, cfu/ml | LB, cfu/ml |
| --- | --- | --- | --- | --- |
| 0 | 5.64 | 0.40 | $8.8 \times 10^8$ | $2.5 \times 10^6$ |
| 4 | 4.94 | 0.54 | $8.0 \times 10^8$ | $3.0 \times 10^6$ |
| 8 | 4.85 | 0.56 | $4.4 \times 10^8$ | $7.0 \times 10^5$ |

Comparative Example 2

Yogurt fermented to pH 5.5 was blended with 1% milk fermented with a complete culture of nisin-producing lactococci having about $5.0 \times 10^8$ cfu/ml of the microorganisms prior to being blended with the yogurt. Although there was no perceptible increase in acidity at one week (not shown), the pH dropped from about 5.5 to about about 4.9 (Table 4) when stored at about 7° C. for 16 days. The ST population fell slightly, whereas the LB population showed about a 100-fold drop (Table 4). The population of nisin-producing lactococci increased about 20-fold during this period. By comparison with the data in Comparative Example 1 (Table 3), these data suggest that nisin-producing lactococci are very effective in controlling lactobacilli, and also inhibit the growth of streptococci. This Example further demonstrates that the increase in acidity occurs together with the growth of the nisin-producing lactococci themselves.

TABLE 4 pH Profile of Yogurt Stabilized with 1% Nisin-Producing Culture and Stored at About 7° C.

| Time (days) | pH | ST cfu/g | LB cfu/g | Nisin Culture cfu/g |
|---|---|---|---|---|
| 0 | 5.5 | $4.1 \times 10^8$ | $7.0 \times 10^5$ | $6.5 \times 10^6$ |
| 16 | 4.9 | $1.4 \times 10^8$ | $5.0 \times 10^3$ | $1.3 \times 10^8$ |

Comparative Example 3

This comparative example illustrates the growth of nisin-producing microorganisms in milk in the absence of yogurt culture. Cold milk was inoculated with nisin-producing lactococci and held at about 7° C. The results shown in Table 5 demonstrate that the nisin-producing lactococci grew during incubation at about 7° C., and continued to produce acid for at least 42 days. Both the lactococcus cell count and the titratable acids increased during this period while the pH decreased. This result suggests that the lactococci are capable of continuously producing acidity for extended periods of time at refrigerated temperatures.

TABLE 5

Growth of Inoculated Lactococci in Skim Milk Held at 6–7° C.

| Time (days) | Lactococci (cfu/g) | pH | Titr. Acid (%) |
|---|---|---|---|
| 0 | $3.5 \times 10^6$ | 6.76 | 0.13 |
| 5 | $9.0 \times 10^6$ | 6.76 | 0.13 |
| 12 | $1.3 \times 10^7$ | 6.76 | 0.13 |
| 23 | $1.6 \times 10^7$ | 6.67 | 0.14 |
| 27 | $3.0 \times 10^8$ | 6.37 | 0.20 |
| 30 | $6.0 \times 10^8$ | 6.03 | 0.29 |
| 34 | $9.0 \times 10^8$ | 5.61 | 0.40 |
| 40 | $9.0 \times 10^8$ | 5.33 | 0.47 |
| 42 | $7.0 \times 10^8$ | 5.12 | 0.51 |

Example 3

This example illustrates the preparation and properties of a nisin-containing whey derived from a nisin-producing culture. Milk was fermented with approximately $5 \times 10^6$ cfu/g nisin-producing lactococci until the culture attained a pH of 4.43. The fermented milk was then centrifuged at 10,000 rpm for 15 minutes and the supernatant (i.e., whey) was recovered. The whey had a pH of 4.45 and a nisin activity of about 1300 IU/ml (essentially the same values as in the fermented milk prior to centrifugation). The whey had a culture population of $6.6 \times 10^6$ cfu/ml (as compared to $8.0 \times 10^8$ cfu/ml in the original fermented milk; see Table 2). The whey recovered from a dairy fermentation of nisin-producing microorganisms has a titer of nisin-producing lactococci that is less than about 1% of that of the fermentation prior to separation of the whey.

In a second run, a skim milk/whey mixture was fermented at pH 5.5 for about 8–10 hours and then allowed to acidify further to a pH of about 4.6. The resulting nisin-containing whey from a pH controlled propagation had a pH of about 4.65, a lactate concentration of about 13.05 g/L, and a nisin activity of aobut 2,100 U/g.

Example 4

This example provides an alternative fermentation for nisin-containing whey yielding a high level of nisin equivalent activity. Sweet whey from fermentations of cheeses such as Swiss cheese, Parmesan cheese, mozzarella cheese, or cheddar cheese is fortified with whey protein concentrate (WPC) and a protein hydrolysate which may be, for example N-Z amine™ or soy protein hydrolysate. The components are blended with water as shown:

| | |
|---|---|
| Cheese whey (Krafen ™) | 3.8% (total solids basis) |
| WPC | 2.9% |
| Protein hydrolysate | 0.1% |
| Water | 93.2% |

The blended formulation (pH ~6.1–6.25) is autoclaved, cooled, and inoculated with a nisin-producing culture at 0.1–1.0%. The fermentation is allowed to proceed to pH 5.5 with stirring, which requires about 7–8 hrs. The pH is then maintained at pH 5.5 for 8–10 hrs by the addition concentrated NaOH by means of a pH controller. The pH regulation is then stopped and the pH allowed to drop to pH 4.8 or lower, at about 22 hrs of total fermentation time. This resulting preparation has a nisin activity of about 2100–2800 IU/g. If necessary it may be centrifuged in order to use the supernatant only, or the whole fermented whey may be used directly.

Example 5

This example illustrates the effect of blending yogurt with nisin-containing whey derived from a nisin-producing culture. Whey derived from skim milk cultured with a nisin-producing culture and containing nisin, such as that produced in Examples 1 and 3, was blended at levels of 3% and 5% with yogurt which had been fermented to different levels of acidity. These blends were held at about 5–7° C. for eight weeks and examined periodically for acidity, yogurt culture population, and nisin producing lactococci.

Two yogurt samples, fermented to pH 5.42 and 5.71, respectively, were blended with 3% cultured skim milk whey derived from a nisin-producing culture. As shown in Table 6, the acidity, nisin activity, and populations of the cultured flora remained essentially unchanged throughout the eight week. Similar results (see Table 7) were obtained with two other yogurt samples, fermented to pH values 5.54 and 5.70, respectively, which were blended with 5% cultured skim milk nisin-containing whey obtained from a nisin-producing culture. In Tables 6 and 7, "NC" is nisin culture.

TABLE 6

Stabilization of Acidity of Yogurt with 3% Whey from Nisin-Producing Culture

| Time (weeks) | pH | Acid, % | ST, $10^8$ cfu/ml | LB, $10^4$ cfu/ml | NC, $10^4$ cfu/ml | Nisin, IU/ml |
|---|---|---|---|---|---|---|
| 0 | 5.42 | 0.44 | 1.3 | 30. | 4.0 | 80 |
| 4 | — | 0.44 | 1.1 | 10. | 3.6 | 90 |
| 8 | — | 0.46 | 1.3 | 7.0 | 2.5 | 80 |
| 0 | 5.71 | 0.36 | .025 | 4.4 | 3.0 | 85 |
| 4 | — | 0.37 | .017 | 3.5 | 2.0 | 80 |
| 8 | — | 0.36 | .017 | 3.0 | 1.0 | 80 |

TABLE 7

Stabilization of Acidity of ABY2C Yogurt after Adding 5% Whey from Nisin-Producing Culture at 5-7° C.

| Time (weeks) | pH | Acid, % | ST, $10^6$ cfu/ml | LB, $10^4$ cfu/ml | NC, $10^4$ cfu/ml | Nisin, IU/ml |
|---|---|---|---|---|---|---|
| 0 | 5.54 | 0.42 | 6.0 | 5.0 | 4.5 | 130 |
| 4 | — | 0.43 | 2.8 | 2.3 | 3.0 | 130 |
| 8 | — | 0.43 | 2.6 | 3.5 | 2.0 | 120 |
| 0 | 5.70 | 0.36 | 0.040 | 1.0 | 2.5 | 140 |
| 4 | — | 0.36 | 0.044 | 0.90 | 2.8 | 130 |
| 8 | — | 0.36 | 0.042 | 1.1 | 2.8 | 120 |

Thus, nisin-containing whey derived from a nisin-producing culture, when added to a yogurt fermentation which was at or near completion, is effective in inhibiting the occurrence of uncoupled acid production (as measured by the acid content) for a period of at least about 8 weeks.

Growth of the yogurt-producing cultures and the nisin-producing microorganism were also essentially terminated while the level of nisin activity remained essentially constant.

Example 6

This example illustrates the use of the nisin-containing whey in products other than yogurt. Cool Whip™ topping has no culture added, has a pH of about 6.5, and has a 15-day shelf life after thawing. When yogurt Cool Whip™ containing conventional acid yogurt having a pH less than about 4.5 was prepared, the product emulsion was destabilized. However, a yogurt Cool Whip™ emulsion having a pH of about 5.9–6.2 was stable when about 3% nisin-containing whey was incorporated, providing the required shelf life without any significant change in organoleptic properties when stored at about 5–7° C.

Example 7

The ultrafiltration retentate from whole milk (3,000 g) was inoculated with mesophilic lactic starter (culture 604) at about $1.5 \times 10^6$ cfu/g and allowed to ferment at 30° C. for 16 hours. When pH 5.6 was reached, 1000 g of fermented retentate was removed and a comparable amount of a 5% water slurry of dried nisin whey was thoroughly mixed in the fermented retentate. The culture was allowed to further incubate at 30° C. for up to 45 hours. These fermentates were then placed at 5° C. for 8 days to study lactose utilization and the pH of the retentate.

The results, presented in Table 8, show that in a sample without nisin whey the pH continued to drop until almost all the lactose was exhausted. In the sample treated with nisin whey the concentration of lactose was about 2.4% at about pH 5.4 after whey addition. These values did not change upon further storage at 30° C. for up to 45 hours and for an additional 8 days at 5° C. Thus the addition of nisin-containing whey has the effect of inhibiting acid production and effectively minimizing the consumption of lactose in the fermentation.

TABLE 8

Whole Milk Retentate Fermentation Profile With and Without Nisin-Containing Fermented Whey

| Time (hours) | Regular Fermentation | | | Fermentation Interrupted with Nisin-Containing Fermented Material | | | |
|---|---|---|---|---|---|---|---|
| | Lactose (%) | pH | cfu/g | Lactose (%) | pH | cfu/g | Nisin Units/g |
| 0 | 1.1 | 6.61 | $1.5 \times 10^6$ | 1.1 | 6.61 | $1.5 \times 10^6$ | — |
| 16 | 0.6 | 5.6 | $2.0 \times 10^9$ | 0.6 | 5.6 | $2.1 \times 10^9$ | — |
| 18 | 0.36 | 5.36 | — | •2.6 | 5.41 | — | 650 |
| 24 | 0.13 | 5.16 | — | 2.4 | 5.45 | $3.6 \times 10^8$ | 650 |
| 24 | 0.06 | 5.16 | — | 2.4 | 5.41 | — | ND |
| 240 | — | — | — | 2.4 | 5.41 | — | ND |

ND indicates not detected
• indicates the time of addition of nisin-containing whey.

That which is claimed is:

1. A method of stabilizing a fermented dairy product against an increase of acidic components during storage, said method comprising the steps of
    (1) providing a fermented dairy culture;
    (2) providing a nisin-containing whey separated from a dairy composition cultured with a nisin-producing culture; and
    (3) combining the fermented dairy culture with an amount of the nisin-containing whey effective to stabilize the fermented dairy product against an increase of acidic components during storage, wherein the nisin-containing whey is obtained by a process comprising the steps of
        (i) inoculating a pasteurized dairy composition with a culture of a nisin-producing microorganism;
        (ii) incubating the composition of step (i) until the pH attains a value between about 6.2 and about 4.0, thereby forming a curd and whey mixture; and
        (iii) separating the nisin-containing whey from the curd in the curd and whey mixture to obain the nisin-containing whey.
2. A method as defined in claim 1, wherein the amount of the nisin-containing whey combined with the fermented dairy product is in the range of about 1 to about 10 percent.
3. A method as defined in claim 2, wherein the amount of the nisin-containing whey combined with the fermented dairy product is in the range of about 3 to about 5 percent.
4. A method as defined in claim 1, wherein the fermented dairy product is yogurt prepared from skim milk, low-fat milk, whole milk, or the retentate from ultrafiltered milk.

5. A method as defined in claim 4, wherein the amount of the nisin-containing whey combined with the fermented dairy product is in the range of about 1 to about 10 percent.

6. A method as defined in claim 5, wherein the amount of the nisin-containing whey combined with the fermented dairy product is in the range of about 3 to about 5 percent.

7. A method as defined in claim 1, wherein the fermented dairy product further comprises a syrup selected from the group consisting of corn syrup, high fructose corn syrup, and mixtures thereof.

8. A method as defined in claim 1, wherein the fermented dairy product further comprises a flavoring selected from the group consisting of cocoa and chocolate.

9. A method of stabilizing a fermented dairy product against an increase of acidic components during storage, said method comprising the step of combining a fermented dairy culture with nisin-containing whey derived from a nisin producing culture in an amount effective to stabilize the fermented dairy product against an increase of acidic components during storage, wherein the nisin-containing whey is obtained by a process comprising the steps of (1) inoculating a pasteurized dairy composition with a culture of a nisin-producing microorganism;

(2) incubating the composition until the pH attains a value between about 6.2 and about 4.0 and a whey and curd mixture is formed; and (3) separating the whey from the whey and curd mixture, wherein the separated whey is the nisin-containing whey.

10. A method as defined in claim 9, wherein the amount of the nisin-containing whey combined with the fermented dairy product is in the range of about 1 to about 10 percent.

11. A method as defined in claim 10, wherein the amount of the nisin-containing whey combined with the fermented dairy product is in the range of about 3 to about 5 percent.

12. A method as defined in claim 9, wherein the fermented dairy product is yogurt prepared from skim milk, low-fat milk, whole milk, or the retentate from ultrafiltered milk.

13. A method as defined in claim 12, wherein the amount of the nisin-containing whey combined with the fermented dairy product is in the range of about 1 to about 10 percent.

14. A method as defined in claim 13, wherein the amount of the nisin-containing whey combined with the fermented dairy product is in the range of about 3 to about 5 percent.

15. A method as defined in claim 9, wherein the fermented dairy product further comprises a syrup selected from the group consisting of corn syrup, high fructose corn syrup, and mixtures thereof.

16. A method as defined in claim 9, wherein the fermented dairy product further comprises a flavoring selected from the group consisting of cocoa and chocolate.

17. A method of stabilizing a fermented dairy product against depletion of lactose during storage, said method comprising the step of combining a fermented dairy culture with nisin-containing whey derived from a nisin-producing culture in an amount effective to stabilize the fermented dairy product against a depletion of lactose during storage, wherein the nisin-containing whey is obtained by a process comprising the steps of (1) inoculating a pasteurized dairy composition with a culture of a nisin-producing microorganism;

(2) incubating the composition until the pH attains a value between about 6.2 and about 4.0 and a whey and curd mixture is formed; and (3) separating the whey from the whey and curd mixture, wherein the separated whey is the nisin-containing whey.

18. A method as defined in claim 17, wherein the amount of the nisin-containing whey combined with the fermented dairy product is in the range of about 1 to about 10 percent.

19. A method as defined in claim 18, wherein the amount of the nisin-containing whey combined with the fermented dairy product is in the range of about 3 to about 5 percent.

20. A method as defined in claim 17, wherein the concentration of lactose remains within 50% of its starting concentration during storage.

21. A method as defined in claim 17, wherein the fermented dairy product is yogurt prepared from skim milk, low-fat milk, whole milk, or the retentate from ultrafiltered milk.

22. A method as defined in claim 21, wherein the amount of the nisin-containing whey combined with the fermented dairy product is in the range of about 1 to about 10 percent.

23. A method as defined in claim 22, wherein the amount of the nisin-containing whey combined with the fermented dairy product is in the range of about 3 to about 5 percent.

24. A method as defined in claim 23, wherein the concentration of lactose remains within 50% of its starting concentration during storage.

25. A method as defined in claim 17, wherein the fermented dairy product further comprises a syrup selected from the group consisting of corn syrup, high fructose corn syrup, and mixtures thereof.

26. A method as defined in claim 17, wherein the fermented dairy product further comprises a flavoring selected from the group consisting of cocoa and chocolate.

27. A method of stabilizing a fermented dairy product against an increase of acidic components during storage, said method comprising the steps of (1) providing a fermented dairy culture;

(2) providing a nisin-containing whey separated from a dairy composition cultured with a nisin-producing culture; and (3) combining the fermented dairy culture with an amount of the nisin-containing whey effective to stabilize the fermented dairy product against an increase of acidic components during storage, wherein the nisin-containing whey is obtained by a process comprising the steps of (i) inoculating a pasteurized dairy composition with a culture of a nisin-producing microorganism;

(ii) incubating the composition of step (i) until the pH attains a value between about 6.2 and about 4.0, thereby forming a curd and whey mixture; and (iii) separating the nisin-containing whey from the curd in the curd and whey mixture to obain the nisin-containing whey.

28. A method of stabilizing a fermented dairy product against an increase of acidic components during storage, said method comprising the step of combining a fermented dairy culture with nisin-containing whey derived from a nisin producing culture in an amount effective to stabilize the fermented dairy product against an increase of acidic components during storage, wherein the nisin-containing whey is obtained by a process comprising the steps of (1) inoculating a pasteurized dairy composition with a culture of a nisin-producing microorganism;

(2) incubating the composition until the pH attains a value between about 6.2 and about 4.0 and a whey and curd mixture is formed; and (3) separating the whey from the whey and curd mixture, wherein the separated whey is the nisin-containing whey.

29. A method of stabilizing a fermented dairy product against depletion of lactose during storage, said method comprising the step of combining a fermented dairy culture with nisin-containing whey derived from a nisin-producing culture in an amount effective to stabilize the fermented dairy product against a depletion of lactose during storage, wherein the nisin-containing whey is obtained by a process comprising the sequential steps of
  (i) preparing an aqueous composition comprising sweet whey from the fermentation of a cheese, whey protein concentrate, and a protein hydrolysate;
  (ii) fermenting the aqueous composition with a nisin-producing culture until the pH attains about 5.5;
  (iii) maintaining the pH of the fermenting composition at about 5.5 for 8–10 hrs; and
  (iv) allowing the pH of the fermenting composition to drop to 4.8 or lower, wherein the resulting composition comprises the nisin-containing whey.

* * * * *